United States Patent
Abolfazlian et al.

(10) Patent No.: US 9,359,911 B2
(45) Date of Patent: Jun. 7, 2016

(54) WIND TURBINE HAVING HELIPLATFORM ARRANGEMENT AND METHOD OF USING SAME

(75) Inventors: Mazyar Abolfazlian, Brabrand (DK); Morten Mogensen, Hvidovre (DK)

(73) Assignee: Vestas Wind Systems A/S, Aarhus N. (DK)

( * ) Notice: Subject to any disclaimer, the term of this patent is extended or adjusted under 35 U.S.C. 154(b) by 421 days.

(21) Appl. No.: 13/983,477

(22) PCT Filed: Feb. 7, 2012

(86) PCT No.: PCT/DK2012/050047
§ 371 (c)(1),
(2), (4) Date: Aug. 2, 2013

(87) PCT Pub. No.: WO2012/107049
PCT Pub. Date: Aug. 16, 2012

(65) Prior Publication Data
US 2013/0309090 A1    Nov. 21, 2013

Related U.S. Application Data

(60) Provisional application No. 61/440,051, filed on Feb. 7, 2011.

(30) Foreign Application Priority Data

Feb. 15, 2011   (DK) .................................. 2011 70087

(51) Int. Cl.
*F01D 5/08*   (2006.01)
*F01D 25/12*   (2006.01)
(Continued)

(52) U.S. Cl.
CPC ................ *F01D 25/12* (2013.01); *F03D 1/003* (2013.01); *F03D 11/00* (2013.01); *F03D 11/04* (2013.01);
(Continued)

(58) Field of Classification Search
CPC ..... F03D 11/04; F01D 25/12; F05B 2240/14; F05B 2240/916; F05B 2260/20; F05B 2260/201; Y02T 50/675; Y02B 10/30; Y02E 10/726; Y02E 10/728
USPC .......................................................... 416/95
See application file for complete search history.

(56) References Cited

U.S. PATENT DOCUMENTS

2007/0110578 A1    5/2007  Stommel
2011/0272949 A1 *  11/2011  Matsuo et al. .................. 290/55

FOREIGN PATENT DOCUMENTS

DE           20205396 U1    11/2002
DE      102006034299 A1    1/2008
(Continued)

OTHER PUBLICATIONS

International Searching Authority, Search Report and Written Opinion issued in corresponding International Application No. PCT/DK2012/050047 dated Jul. 4, 2012, 18 pages.
Danish Patent Office, Examination Report issued in corresponding Danish Application No. PA 2011 70087 dated Sep. 30, 2011, 6 pages.

*Primary Examiner* — Zelalem Eshete
(74) *Attorney, Agent, or Firm* — Wood, Herron & Evans, LLP

(57) ABSTRACT

A wind turbine for generating electrical energy may include a tower, a nacelle at the top of the tower, and a rotor coupled to a generator within the nacelle. The wind turbine further includes a cooler including a spoiler and at least one cooler panel projecting above a roof of the nacelle. A heliplatform includes a support structure extending from the nacelle and at least partially integrated with the cooler. The wind turbine may also include a crane coupled to the nacelle and configured to move between a first stowed position underneath the nacelle roof and a second operational position. In the operational position, the crane is selectively positionable over the heliplatform. A method of using the wind turbine and crane is also disclosed.

16 Claims, 11 Drawing Sheets

(51) Int. Cl.
  *F03D 1/00* (2006.01)
  *F03D 11/00* (2006.01)
  *F03D 11/04* (2006.01)

(52) U.S. Cl.
  CPC ....... *F05B 2240/14* (2013.01); *F05B 2240/916* (2013.01); *F05B 2260/20* (2013.01); *F05B 2260/201* (2013.01); *Y02B 10/30* (2013.01); *Y02E 10/726* (2013.01); *Y02E 10/728* (2013.01); *Y02T 50/675* (2013.01)

(56) References Cited

FOREIGN PATENT DOCUMENTS

| | | |
|---|---|---|
| EP | 1101934 A2 | 5/2001 |
| EP | 1134410 A1 | 9/2001 |
| EP | 1284365 A2 | 2/2003 |
| WO | 2009132671 A2 | 11/2009 |
| WO | 2010037392 A2 | 4/2010 |
| WO | 2010085960 A2 | 8/2010 |
| WO | 2010085962 A2 | 8/2010 |
| WO | 2010085963 A2 | 8/2010 |

\* cited by examiner

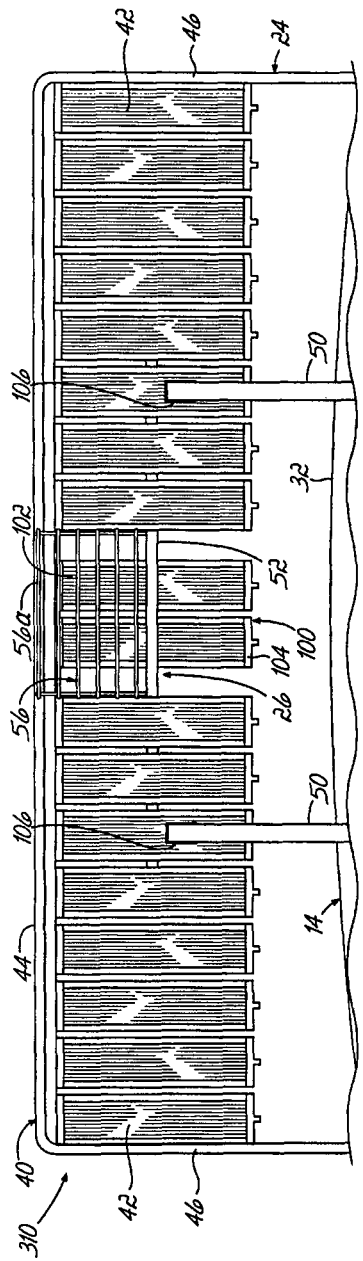
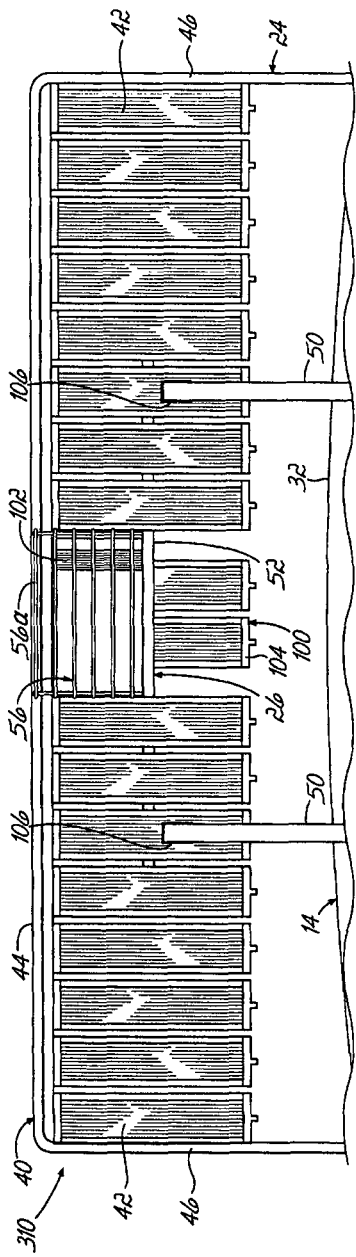

WIND TURBINE HAVING HELIPLATFORM ARRANGEMENT AND METHOD OF USING SAME

TECHNICAL FIELD

The invention relates generally to wind turbines, and more particularly to a wind turbine having a cooler and heliplatform arrangement configured to position the heliplatform at a certain location relative to the cooler, and a crane configured to operate at the heliplatform.

BACKGROUND

Wind turbines are used to produce electrical energy using a renewable resource and without combusting a fossil fuel. Generally, a wind turbine converts kinetic energy from the wind into electrical power. A horizontal-axis wind turbine includes a tower, a nacelle located at the apex of the tower, and a rotor having a plurality of blades and supported in the nacelle by means of a shaft. The shaft couples the rotor either directly or indirectly with a generator, which is housed inside the nacelle. Consequently, as wind forces the blades to rotate, electrical energy is produced by the generator.

Components of the generator located within the nacelle generate significant heat during operation, which in turn, causes the temperature of the nacelle walls and the generator components to increase. When the generator components are heated, the overall efficiency of power generation may be decreased. Therefore, the generator components and the nacelle may be cooled to ensure that the heat does not adversely affect power generation and/or damage the components.

Conventional wind turbines may include one or more cooling devices configured to remove the heat generated during operation of the wind turbine. The cooling devices may include standard heat sinks. Another exemplary cooling device is a cooler top positioned along one side (e.g., the top surface or roof) of the nacelle and including one or more panels partially enclosed by a cover or spoiler to encourage air flow over the panels. The air flowing past the wind turbine cools a second fluid free flowing through the panels, the second fluid being directed to other heat exchangers within the nacelle to remove heat from generator components and the nacelle. To this end, the cooling devices operate without being separately powered to thereby reduce the temperature of the nacelle and the generator components.

Conventional wind turbines may include a heliplatform or helihoist platform (hereinafter collectively referred to generally as a "heliplatform") adjacent to the nacelle for receiving a helicopter or supplies/personnel hoisted from a hovering helicopter to the heliplatform. The heliplatform includes a platform, a railing surrounding the platform, and a support structure for the platform. As the heliplatform is configured to support workers and/or a helicopter carrying workers, the placement of the heliplatform in relation to the nacelle is typically subject to numerous safety regulations in certain countries. For example, the railing of the heliplatform must conform to a minimum height safety standard. Additionally, the heliplatform (e.g., including the railing) may be required to be the highest point of the wind turbine, excluding the blades. Consequently, the support structure for the heliplatform must position the heliplatform at least coplanar with the highest point of the nacelle or above the nacelle to fully comply with such safety regulations. In conventional wind turbines, the heliplatform is generally positioned at a rear end of the nacelle roof (e.g., opposite to the rotor) to comply with these regulations. However, when a cooling device such as the cooler top is added to a wind turbine, the conventional placement of a heliplatform may no longer comply with safety regulations because the platform and/or railing thereof may be located below the level of the cover or spoiler.

Furthermore, conventional wind turbines may include a crane or winch for moving replacement or new components delivered to the nacelle. For example, the crane or winch may include a service crane operable within the nacelle. However, conventional cranes or winches are typically not operable to move components to or from the heliplatform when the heliplatform is positioned mostly behind the nacelle. In this regard, conventional cranes and winches cannot extend over the heliplatform to move items onto and off of the heliplatform. Accordingly, during significant repair or restoration of the wind turbine, a larger secondary crane may need to be mounted on rails on the nacelle to provide crane operational coverage at the heliplatform as well as the nacelle roof. Mounting and removing this secondary crane is expensive and inefficient because this process adds significant downtime to the repair or restoration of a wind turbine.

Thus, there remains a need for an improved cooler and heliplatform arrangement that addresses these and other shortcomings in conventional wind turbines. Furthermore, there is also a need for an improved crane that addresses these and other shortcomings in conventional wind turbines.

SUMMARY

According to one embodiment, a wind turbine includes a tower and a nacelle located adjacent the top of the tower and having a nacelle roof. The wind turbine also includes a rotor with a hub and at least one wind turbine blade operatively coupled to a generator housed within the nacelle. The generator is configured to produce electrical power from the rotation of the wind turbine blade. The wind turbine also includes a cooler having a spoiler and at least one cooler panel projecting above the nacelle roof. The cooler removes heat from the interior of the nacelle. A heliplatform includes a support structure extending from the nacelle and at least partially integrated with the cooler.

The heliplatform may further include a platform and a railing surrounding the platform, each of which may be substantially coplanar with the spoiler in alternative embodiments. A front portion of the platform may project forward of the cooler panels while a rear portion of the platform may be disposed rearward of the cooler panels. To accommodate the platform, the cooler panels may define a gap for the platform, or one of the cooler panels may be pivotally mounted so that the cooler panel can open to provide access between the front and rear portions of the platform. The support structure may further include at least one triangular frame at least partially integrated with the cooler.

In another embodiment, a wind turbine includes a tower and a nacelle located adjacent the top of the tower and having a nacelle roof. The wind turbine also includes a rotor with a hub and at least one wind turbine blade operatively coupled to a generator housed within the nacelle. The wind turbine further includes a heliplatform having a support structure extending from the nacelle. A crane is coupled to the nacelle and is configured to move between a stowed position underneath the nacelle roof and an operational position. In the operational position, the crane is selectively positionable over the heliplatform.

In yet another embodiment, a method of using a wind turbine is provided. The wind turbine includes a nacelle having a nacelle roof with a plurality of openable panels, a crane supported by the nacelle, and a heliplatform. The method includes opening at least one of the panels in the nacelle roof to uncover the crane. The crane may be moved from a stowed position underneath the nacelle roof to an operational position. In the operational position, the crane is selectively positionable above the heliplatform. The method also includes hoisting items on the heliplatform into the nacelle through at least one of the panels with the crane. The method may also include moving the crane from the operational position back to the stowed position underneath the nacelle roof, and closing the plurality of panels to cover the crane.

BRIEF DESCRIPTION OF THE DRAWINGS

The accompanying drawings, which are incorporated in and constitute a part of this specification, illustrate an embodiment of the invention and, together with a general description of the invention given above, and the detailed description given below, serve to explain the invention.

FIG. 11A is a partial front view of the nacelle of FIG. 1, including a cooler and heliplatform arrangement according to another embodiment; and FIG. 11B is a partial front view of the nacelle of FIG. 11A, with the central cooler panel rotated to an open position.

DETAILED DESCRIPTION

Figure 1:
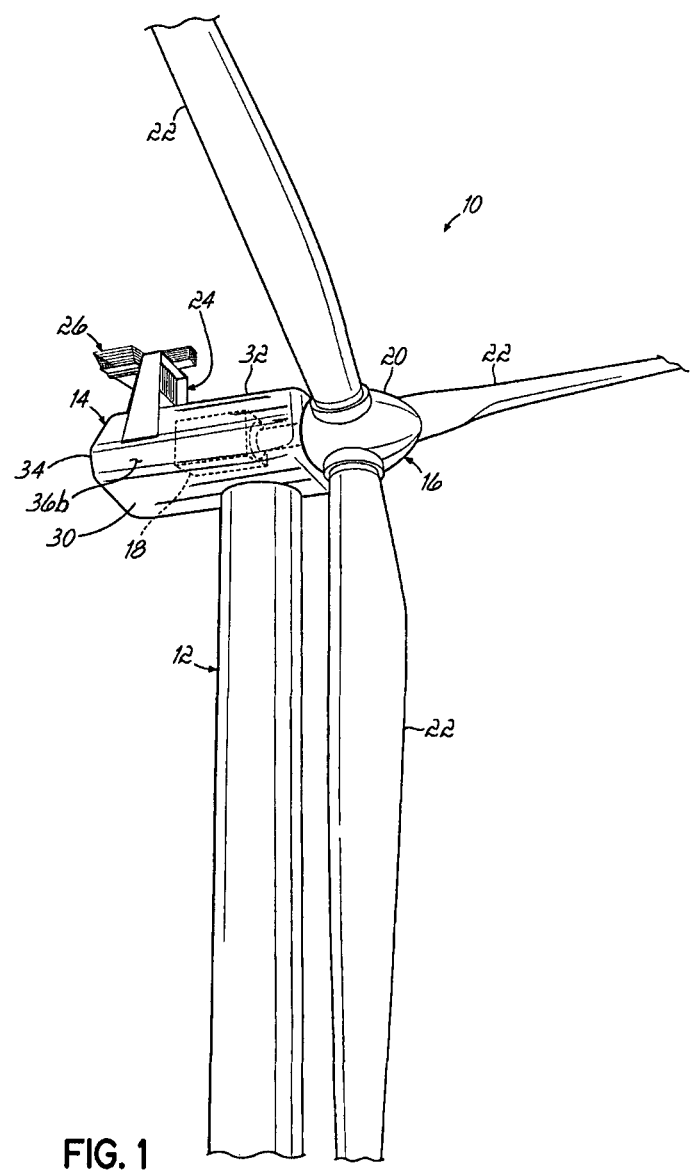
FIG. 1 is a partial perspective view of a wind turbine.

With reference to FIG. 1, a wind turbine 10 includes a tower 12, a nacelle 14 disposed at the apex of the tower 12, and a rotor 16 operatively coupled to a generator 18 housed inside the nacelle 14. In addition to the generator 18, the nacelle 14 houses miscellaneous components required for converting wind energy into electrical energy and various components needed to operate, control, and optimize the performance of the wind turbine 10. The tower 12 supports the load presented by the nacelle 14, the rotor 16, and other components of the wind turbine 10 that are housed inside the nacelle 14, and also operates to elevate the nacelle 14 and rotor 16 to a height above ground level or sea level, as may be the case, at which faster moving air currents of lower turbulence are typically found.

The rotor 16 of the wind turbine 10, which is represented as a horizontal-axis wind turbine, serves as the prime mover for the electromechanical system. Wind exceeding a minimum level will activate the rotor 16 and cause rotation in a substantially perpendicular direction to the wind direction. The rotor 16 of wind turbine 10 includes a central hub 20 and at least one blade 22 that projects outwardly from the central hub 20. In the representative embodiment, the rotor 16 includes three blades 22 circumferentially distributed about the central hub 20, but the number may vary. The wind turbine blades 22 are configured to interact with the passing air flow to produce lift that causes the rotor 16 to spin generally within a plane defined by the blades 22.

The wind turbine 10 may be included among a collection of similar wind turbines belonging to a wind farm or wind park that serves as a power generating plant connected by transmission lines with a power grid, such as a three-phase alternating current (AC) power grid. The power grid generally consists of a network of power stations, transmission circuits, and substations coupled by a network of transmission lines that transmit the power to loads in the form of end users and other customers of electrical utilities. Under normal circumstances, the electrical power is supplied from the generator 18 to the power grid as known to a person having ordinary skill in the art.

Figure 2:
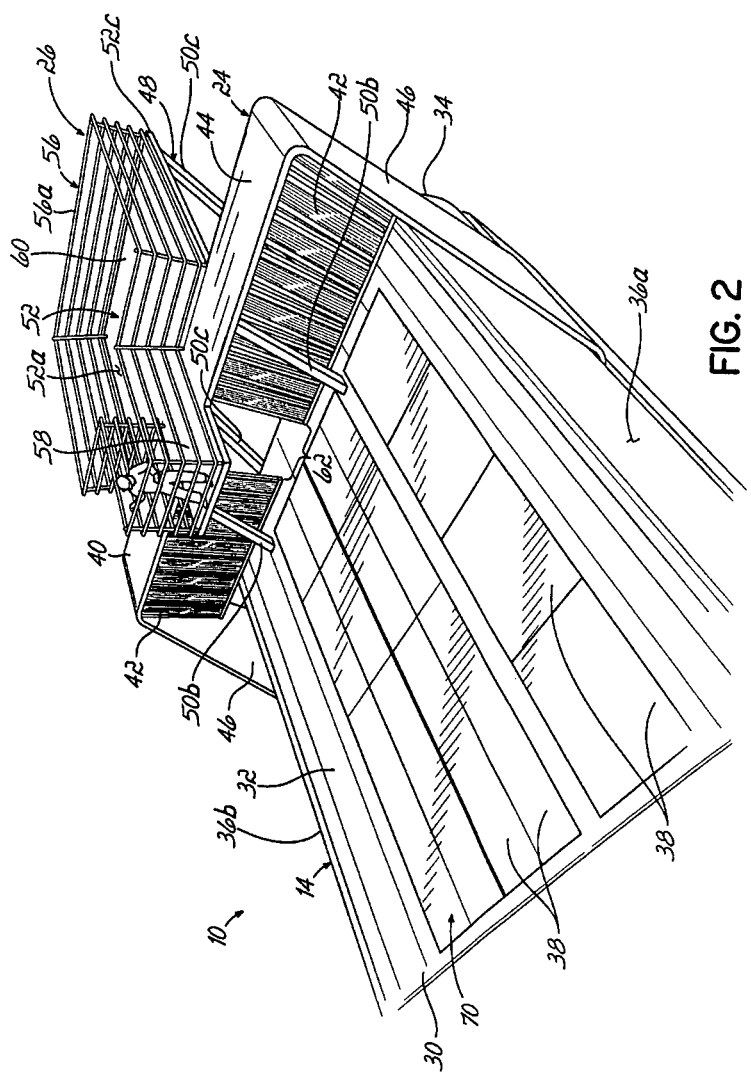
FIG. 2 is a partial perspective view of the nacelle of the wind turbine of FIG. 1, including a cooler and heliplatform arrangement according to a first embodiment.

In order to provide cooling for the generator 18 and the nacelle 14, the wind turbine 10 according to a first embodiment includes a cooler 24 as shown in FIG. 2. The wind turbine 10 also includes a heliplatform 26 for receiving a helicopter or turbine components and/or working personnel hoisted from a hovering helicopter (i.e., the heliplatform 26 also functions as a helihoist platform). To this end, the wind turbine 10 of the embodiment shown in FIGS. 2-6B includes a cooler and heliplatform arrangement described in further detail below. The wind turbine 10 of this embodiment may also include a crane 28 for moving items to and from the nacelle 14 and the heliplatform 26, the crane 28 being shown in phantom in FIG. 3.

Figure 3:
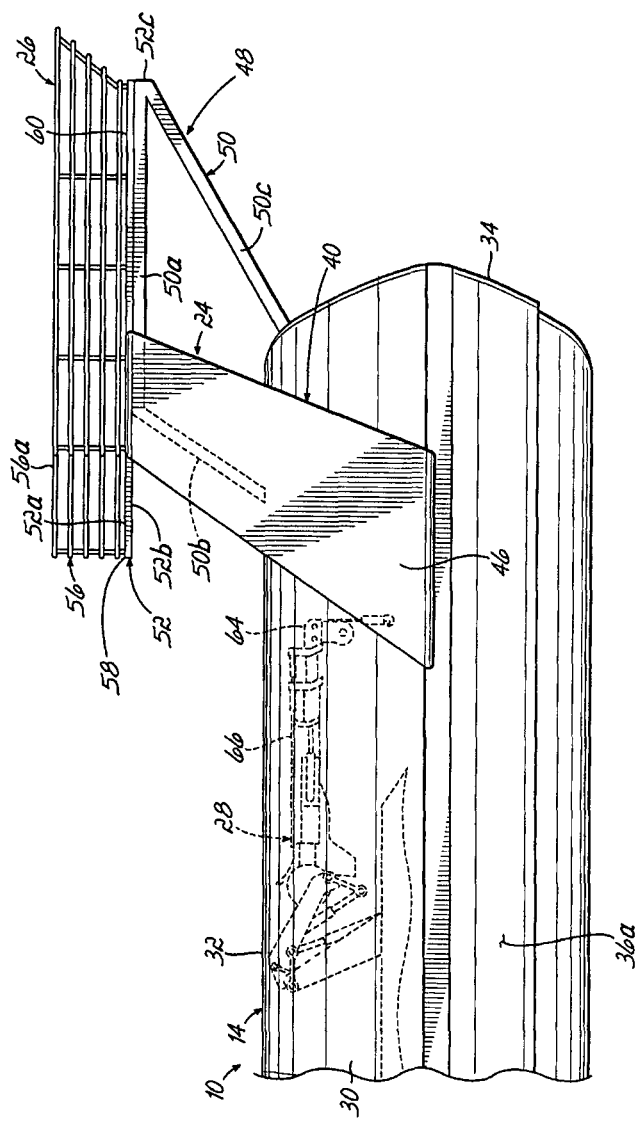
FIG. 3 is a partial side view of the nacelle of FIG. 2.
Figure 4:
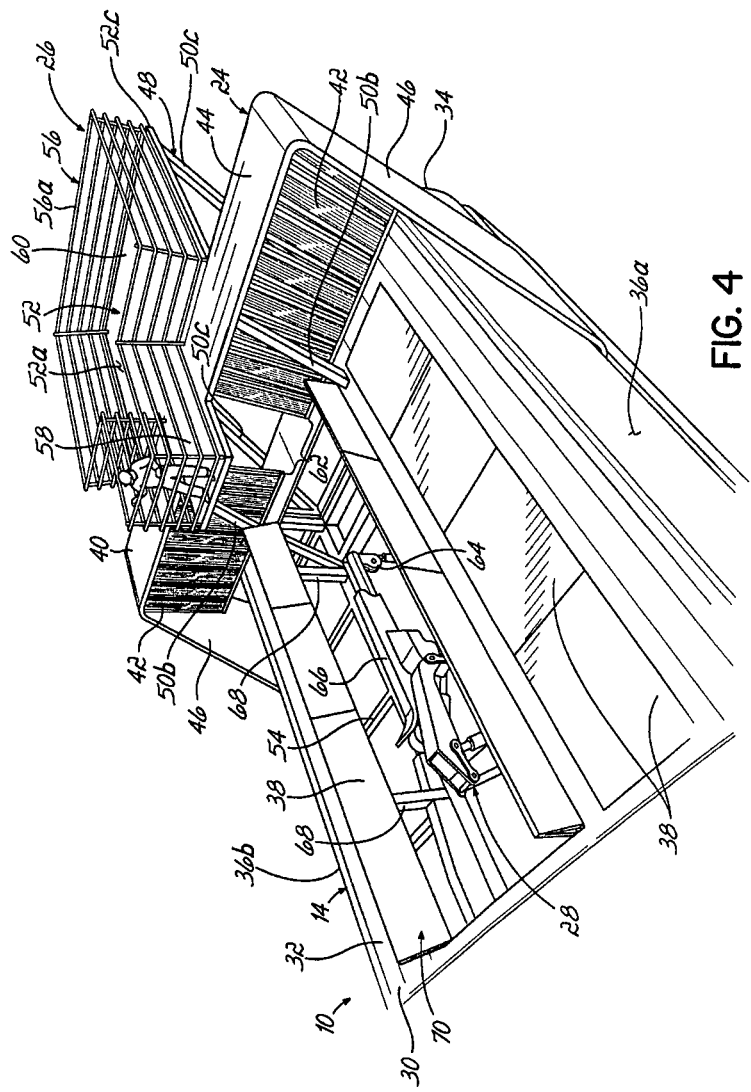
FIG. 4 is a partial perspective view of the nacelle of FIG. 2, with panels on the nacelle roof opened.

As shown in FIGS. 2-6B, the nacelle 14 includes an outer housing 30 defined, at least in part, by a nacelle roof 32, a rear wall 34, and a pair of sidewalls 36a, 36b. The rear wall 34 of the nacelle 14 generally faces a direction opposite from the hub 20 and wind turbine blades 22. The rear wall 34 may be oriented to be upwind or downwind from the wind turbine blades 22 in various embodiments. The nacelle roof 32 may have a paneled configuration and include a plurality of panels 38 configured to be opened as shown in FIG. 4 to provide access between the interior of the wind turbine 10 and the exterior surroundings of the nacelle 14. The panels 38 may cover a substantial portion of the surface area of the nacelle roof 32 so that replacement parts and components may be hoisted into the nacelle 14 close to the point of installation or removal. The panels 38 are illustrated as hinged panels in the current embodiment, but it will be appreciated that the panels 38 may be slidable or otherwise moveable between opened and closed positions in other embodiments. The panels 38 are generally configured to be opened individually by separate mechanical actuators (not shown), as is well understood in the field of wind turbines.

To ensure efficient and safe operation of the wind turbine 10, the cooler 24 is provided to remove heat generated within the nacelle 14 by the generator 18 and other interior components. The cooler 24 includes many of the same elements as the cooling device disclosed in International Patent Publication No. WO2010/085962, which is owned by the assignee of the present application and is incorporated by reference herein in its entirety. As shown in FIG. 2, the cooler 24 includes a spoiler 40 (also referred to as a "cover" in the cooler art) and a plurality of cooler panels 42 projecting upwardly from the nacelle roof 32 so as to generally extend between the nacelle roof 32 and the spoiler 40. The cooler panels 42 operate as heat exchangers that transfer heat in a first fluid (e.g., coolant, refrigerant, etc.) flowing through the cooler panels 42 to a second fluid (e.g., wind) flowing around the cooler panels 42. Preferably, the cooler 24 operates as a free-flow cooling device wherein wind is encouraged to pass over the cooler panels 42 to cool the first fluid flowing in the cooler panels 42 without the assistance of fans or other actuators requiring power from the generator 18.

The cooler panels 42 shown in FIG. 2 may be rigidly coupled to the nacelle roof 32 and the spoiler 40. Alternatively, the cooler panels 42 may be flexibly coupled to one of the nacelle roof 32 and the spoiler 40 to ensure that position fluctuations of the spoiler 40 or expansion/contraction of the cooler panels 42 does not damage the cooler 24. The cooler panels 42 may be disposed generally perpendicular to the nacelle roof 32 to maximize a flow area in the path of wind flowing past the nacelle 14. However, it will be understood that the cooler panels 42 may be disposed at a non-perpendicular angle to the nacelle roof 32 and be within the scope of this invention. The cooler panels 42 are arranged in a row or series with small spacing between adjacent cooler panels 42 to permit wind to pass through the cooler 24. For example, adjacent cooler panels 42 may be separated by a distance of between about 20 millimeters and about 200 millimeters. Each of the cooler panels 42 may be connected to shared supply and return lines (not shown) configured to deliver coolant or refrigerant to and from the cooler panels 42 and the interior components of the nacelle 14 that require cooling. Multiple supply and return lines may be provided in alternative embodiments.

The spoiler 40 includes a top wall 44 and a pair of arms 46 extending downwardly from the top wall 44 to form a generally inverted U-shaped member. Each of the arms 46 may be coupled to the corresponding sidewalls 36a, 36b of the nacelle 14 as shown most clearly in FIG. 3, for example. The top wall 44 and arms 46 are elongate in a direction parallel to the nacelle roof 32 to thereby form a flow channel at least partially surrounding the cooler panels 42. The flow channel between the nacelle roof 32 and the spoiler 40 encourages air flowing past the nacelle 14 to flow over and through the plurality of cooler panels 42, thereby increasing the cooling effect of the cooler 24. It will be appreciated that the top wall 44 and the arms 46 may be angled with respect to the direction of air flow to promote optimal cooling in other embodiments. The top wall 44 of the spoiler 40 is positioned above the nacelle roof 32 and is therefore the top structure of the wind turbine 10 (excluding the blades 22).

To comply with many local and/or national regulations, the heliplatform 26 must be positioned at least as high as the top wall 44 of the spoiler 40. To this end, the heliplatform 26 includes a support structure 48 composed of two generally triangular frame members 50. Each of the frame members 50 includes a top leg 50a extending generally horizontally and configured to underlie (e.g., directly engage) a platform 52 of the heliplatform 26. Each of the frame members 50 also includes a front leg 50b extending forwardly and downwardly from one end of the top leg 50a through the cooler panels 42 and the nacelle roof 32 to an interior frame structure 54 (see FIG. 4) of the nacelle 14. The frame members 50 further include a rear leg 50c extending forwardly and downwardly from the other end of the top leg 50a through the outer housing 30 and the interior frame structure 54 of the nacelle 14. It will be understood that the front leg 50b and rear leg 50c of each frame member 50 may be joined at the same location at the interior frame structure 54 of the nacelle 14, or may alternatively be spaced from one another at the interior frame structure 54 of the nacelle 14 in various embodiments. In this regard, the frame members 50 provide structural support for the heliplatform 26 to position at least a portion of the heliplatform 26 as the highest structure of the wind turbine 10 other than the wind turbine blades 22.

As shown in FIG. 2, the platform 52 includes an upper surface 52a configured to receive replacement components, workers, or a helicopter, a lower surface 52b disposed on or adjacent the frame members 50, and an outer periphery 52c defining the shape of the platform 52. The heliplatform 26 may further include a railing 56 or fence that generally surrounds the upper surface 52a at the outer periphery 52c. The railing 56 is configured to prevent items or workers (one worker shown for illustrative purposes in FIG. 2) from sliding or blowing off the heliplatform 26. According to the safety regulations discussed above, the top 56a of the railing 56 must be the highest structure (or at least coplanar with the highest structure) on the wind turbine 10 (excluding the blades 22). In this regard, the support structure 48 may support the top 56a of the railing 56 above the nacelle roof 32 and the top wall 44 of the spoiler 40. In the embodiment shown in FIGS. 2-6B, the platform 52 is supported so as to be substantially coplanar or adjacent to the top wall 44 of the spoiler 40. As clearly shown in FIG. 3, this positioning of the heliplatform 26 does place the top 56a of the railing 56 as the highest structure on the wind turbine 10, notwithstanding the blades 22. It will be understood that the support structure 48 may support the heliplatform 26 in difference positions than those shown in the figures in other embodiments, as long as the top 56a of the railing 56 is at least as high in elevation as the spoiler 40.

The platform 52 includes a front portion 58 (i.e., where the worker is standing in FIG. 2) extending forwardly from the cooler panels 42 and the spoiler 40, and a rear portion 60 extending rearward of the cooler panels 42 and the spoiler 40. The plurality of cooler panels 42 may include a gap 62 configured to receive the platform 52 between the front portion 58 and the rear portion 60 as shown in FIG. 2. However, when the platform 52 is positioned so as to be substantially coplanar with the spoiler 40, as shown in FIG. 2, the gap 62 may be omitted in some embodiments. The front portion 58 may be used by a worker as shown in FIG. 2 to inspect the nacelle roof 32 or to observe operation of the crane 28 described in further detail below. The rear portion 60 may be larger than the front portion 58 so as to accommodate large replacement components or a helicopter, as understood in the wind turbine art. The rear portion 60 may also include an elevator or ladder (not shown) for transporting a worker from the heliplatform 26 to an access door or skylight (not shown) of the nacelle 14. Such a system would allow a worker to gain access to the interior of the nacelle 14.

As shown most clearly in FIGS. 2 and 3, the heliplatform 26 may be at least partially integrated structurally with the spoiler 40. More particularly, the support structure 48 and/or the platform 52 may be at least partially integrated with the top wall 44 of the spoiler 40. In one exemplary embodiment, the support structure 48 may be integral with the spoiler 40 such that the supporting elements for the cooler 24 and the heliplatform 26 are substantially integrated with each other. The heliplatform 26 may be composed of a mixture of protruded fiberglass material and steel. For example, the platform 52 may be composed of a higher percentage of fiberglass material than steel such that the platform 52 is structurally sound yet lightweight. Limiting the weight of the heliplatform 26 is important because the heliplatform 26 is generally located off the center of gravity of the nacelle 14. Consequently, the fiberglass and steel mixture provides a desirable balance between structural strength and weight forces applied by the heliplatform 26 to the nacelle 14 and the tower 12. It will be appreciated, however, that the heliplatform 26 may be composed of other materials in alternative embodiments without departing from the scope of this invention.

Figure 5:
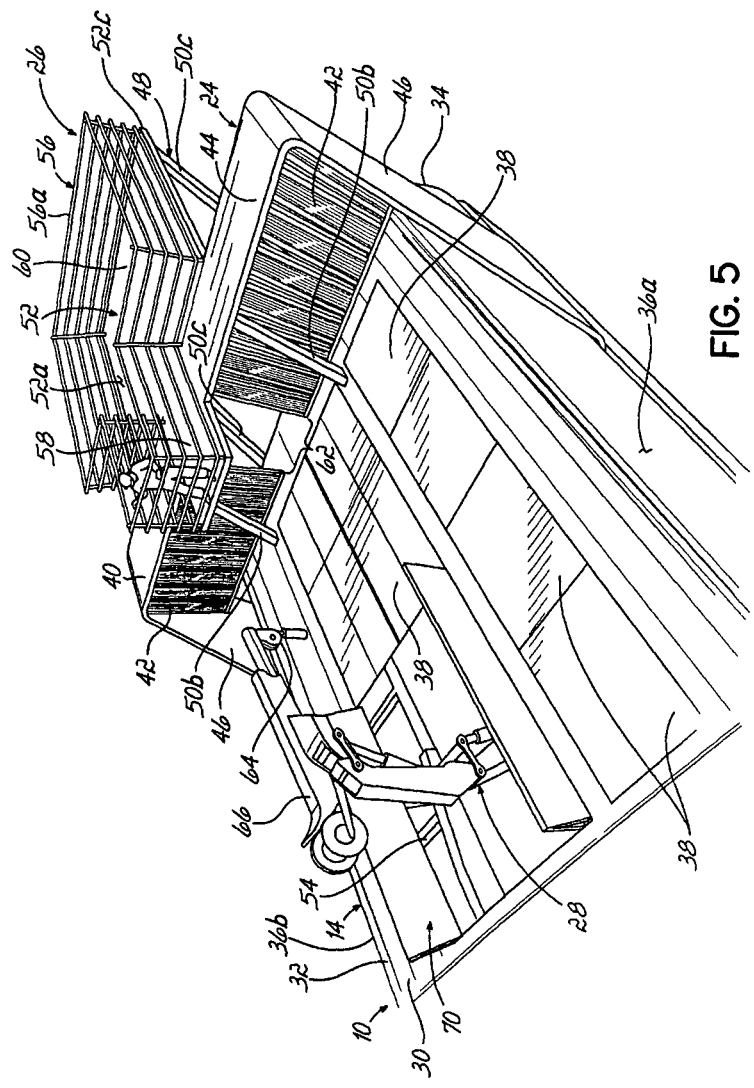
FIG. 5 is a partial perspective view of the nacelle of FIG. 4, with the crane moved above the nacelle roof and a portion of the panels on the nacelle roof closed.
Figure 6A:
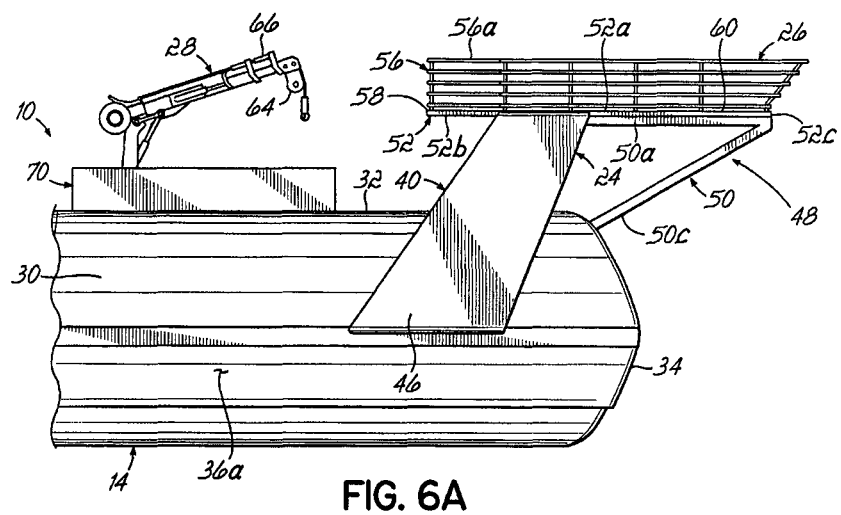
FIG. 6A is a partial side view of the nacelle of FIG. 5, with the crane disposed above the nacelle roof.
Figure 6B:
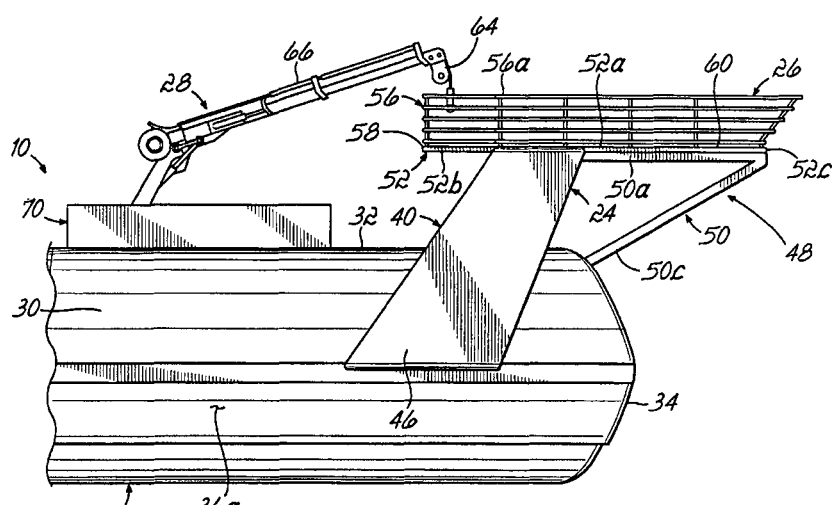
FIG. 6B is a partial side view of the nacelle of FIG. 6A, with the crane extended to a position above the heliplatform.

FIGS. 2-6B illustrate the operation of the crane 28 incorporated with the nacelle 14 for use with the heliplatform 26 according to the first embodiment. In one example, the crane 28 may be a hydraulic knuckle-boom crane commercially available from Palfinger AG of Bergheim, Salzburg Austria. However, other commercially-available crane designs may be used within the scope of this invention. The crane 28 is configured to be stowed completely within the nacelle 14 as shown in FIG. 2 in a first stowed position. The crane 28 is also configured to move to a second operational position. In the operational position, the crane 28 may be moved above the various panels 38 on the nacelle roof 32, or may be moved to the location shown in FIG. 6B wherein the free end 64 of the telescoping boom 66 of the crane 28 is disposed over the heliplatform 26 so as to hoist items to and from the heliplatform 26. Consequently, when the crane 28 is in the operational position as shown in FIGS. 5-6B, the crane 28 is operable to move components from the heliplatform 26 to the correct location within the nacelle 14 through the corresponding panel 38 on the nacelle roof 32. Although the free end 64 of the boom 66 is illustrated over the front portion 58 of the platform 52 in FIG. 6B, it will be understood that the crane 28 may be configured to extend to the rear portion 60 of the platform 52 in some embodiments.

As shown most clearly in FIG. 2, the nacelle roof 32 has a generally planar profile in the first embodiment of the wind turbine 10. To this end, the nacelle roof 32 may be raised uniformly in all areas from the interior frame structure 54 and components of the nacelle 14. A plurality of roof support members 68 may be disposed between the nacelle roof 32 and the interior frame structure 54, as shown in FIG. 4. These roof support members 68 provide adequate space for the crane 28 to be completely stowed within the nacelle 14 and underneath the nacelle roof 32 when the panels 38 are closed as shown, for example, in phantom in FIG. 3. Furthermore, the roof support members 68 also provide adequate clearance between the interior frame structure 54 and the nacelle roof 32 to enable the crane 28 to move and operate completely within the nacelle 14 with the panels 38 closed. In this regard, the crane 28 is configured to be operable to move components around the interior of the nacelle 14 without subjecting the interior components of the nacelle 14 to the outside environment (e.g., the panels 38 may be closed).

In this embodiment, a portion of the panels 38 on the nacelle roof 32 define a cover 70 for the crane 28. The cover 70 is opened by rotating or otherwise moving the panels 38 above the boom 66 of the crane 28 from the closed position in FIG. 2 to the opened position in FIG. 4. As discussed above, the movement of the panels 38 between the open and closed positions may be enabled by known mechanical or electrical actuators. After the boom 66 of the crane 28 is lifted above the plane of the nacelle roof 32, a portion of the panels 38 forming the cover 70 may be closed, as shown in FIG. 5, to limit unnecessary exposure of the interior components of the nacelle 14 to the external environment. However, the panels 38 forming the cover 70 may also be left open during operation of the crane 28 outside the nacelle 14. The crane 28 may then be moved between the nacelle roof 32 and the heliplatform 26, as previously described and shown in FIGS. 6A and 6B.

Figure 7:
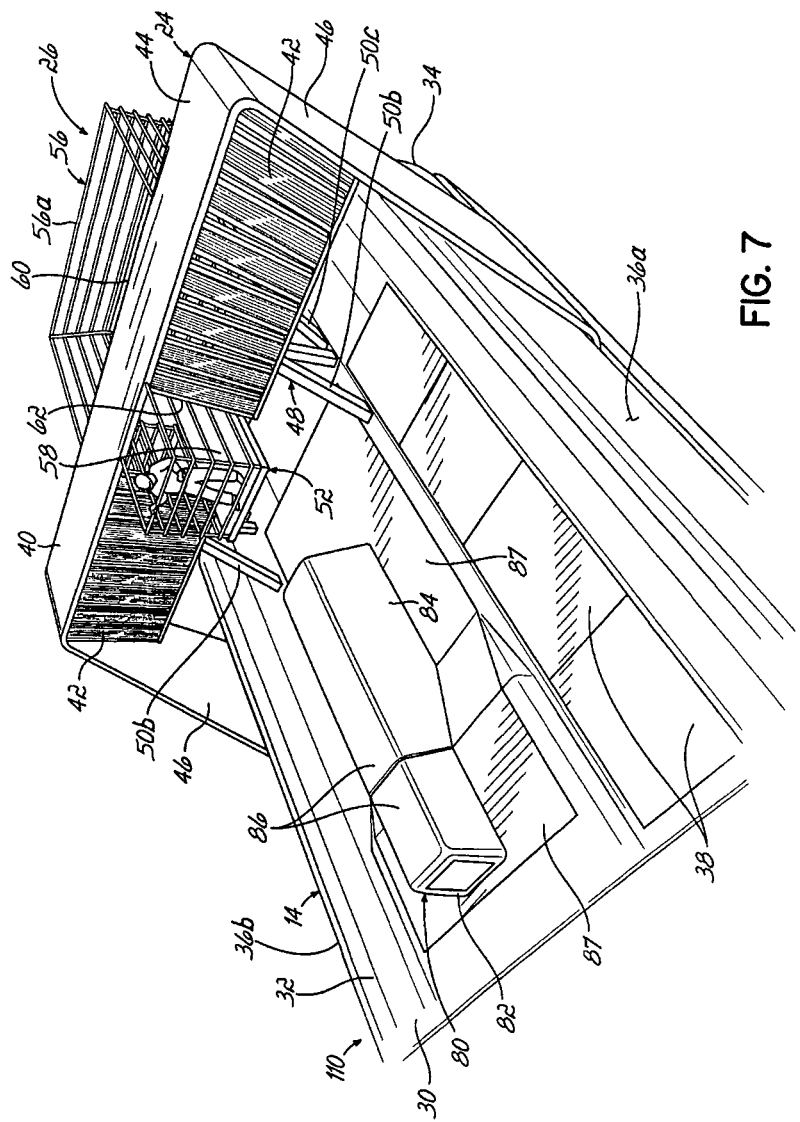
FIG. 7 is a partial perspective view of the nacelle of the wind turbine of FIG. 1, including a cooler and heliplatform arrangement according to a second embodiment.
Figure 8:
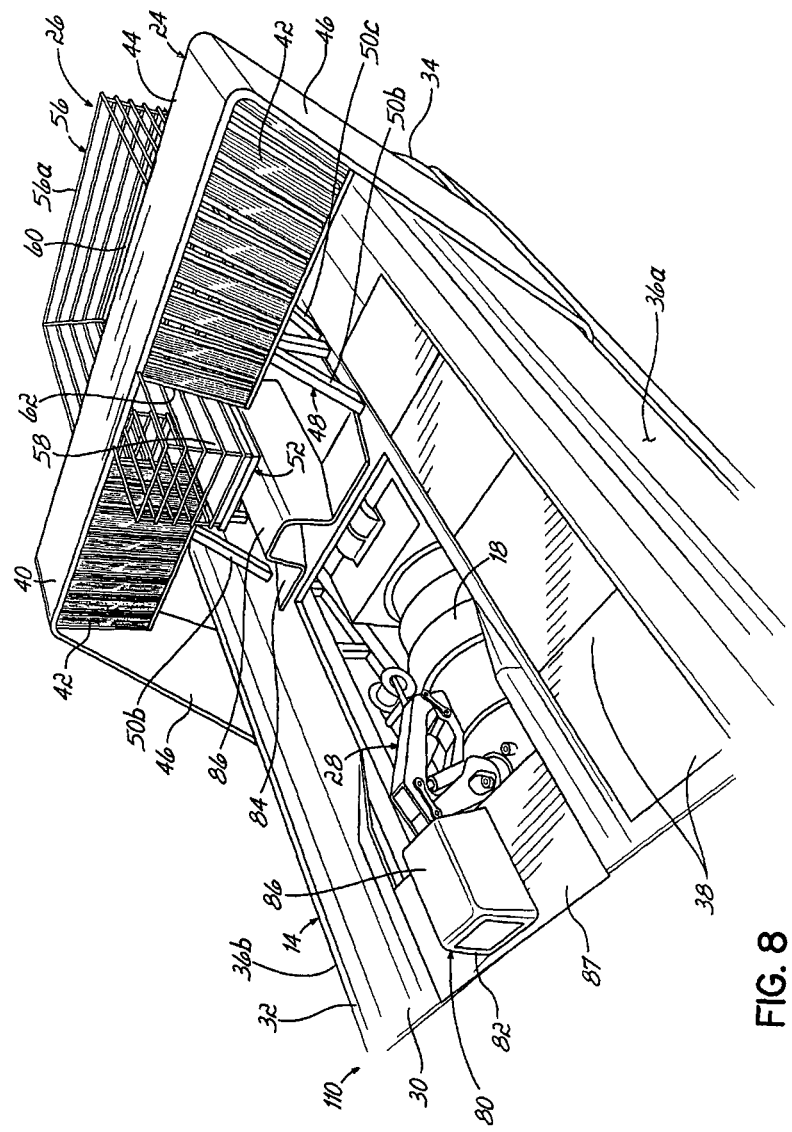
FIG. 8 is a partial perspective view of the nacelle of FIG. 7, with a bifurcated cover on the nacelle roof opened.

A second embodiment of the wind turbine 110 according to the invention is illustrated in FIGS. 7 and 8. This embodiment of the wind turbine 110 includes many of the same elements previously described with reference to FIGS. 1-6B, and these elements have been provided with the same reference numbers. In this embodiment, the support structure 48 has been lowered such that the front portion 58 of the platform 52 extends through the gap 62 in the cooler panels 42. The top 56a of the railing 56 of the heliplatform 26 is positioned substantially coplanar with the top wall 44 of the spoiler 40 as shown in FIG. 7. Consequently, the top 56a of the railing 56 remains the highest structure on the wind turbine 10 (excluding the blades 22) so as to comply with safety regulations. A worker or a replacement component may be moved between the rear portion 60 of the platform 52 and the front portion 58 by moving through the gap 62 in the cooler panels 42 underneath the spoiler 40. It will be understood that the support structure 48 may be modified in other embodiments to position the heliplatform 26 at any height above the position shown in FIGS. 7 and 8 within the scope of this invention.

In the second embodiment of the wind turbine 110, the nacelle roof 32 includes a bifurcated sliding cover 80 configured to cover the crane 28 in the stowed position instead of the cover 70 formed by the panels 38 of the previously-described embodiment. The sliding cover 80 includes a forward portion 82 and a rear portion 84. The forward portion 82 and the rear portion 84 each include a raised portion 86 projecting above the nacelle roof 32 and a second portion 87 configured to be substantially coplanar with the remainder of the nacelle roof 32. The boom 66 of the crane 28 is configured to snugly fit within the raised portion 86 when the cover 80 is closed, as shown in FIG. 7. In this regard, the crane 28 is generally not operable within a closed nacelle 14, in contrast to that described with reference to the first embodiment.

To deploy the crane 28, the forward portion 82 of the cover 80 may be configured to slide forwardly, and the rear portion 84 of the cover 80 may be configured to slide rearward along the nacelle roof 32. The sliding movement of the forward portion 82 and rear portion 84 may be enabled by known mechanical or electrical actuators. When the forward portion 82 and rear portion 84 are opened, as shown in FIG. 8, the crane 28 may be moved to the operational position above the nacelle roof 32. As with the previous embodiment, and as shown in FIGS. 6A and 6B, the telescoping boom 66 of the crane 28 may be extended so that items may be moved from the heliplatform 26 to the interior of the nacelle 14 through one or more of the selected panels 38. When movement of items is complete, the crane 28 may be moved back to the stowed position shown in FIG. 8 such that the bifurcated cover 80 may be moved back to the closed position.

Figure 9:
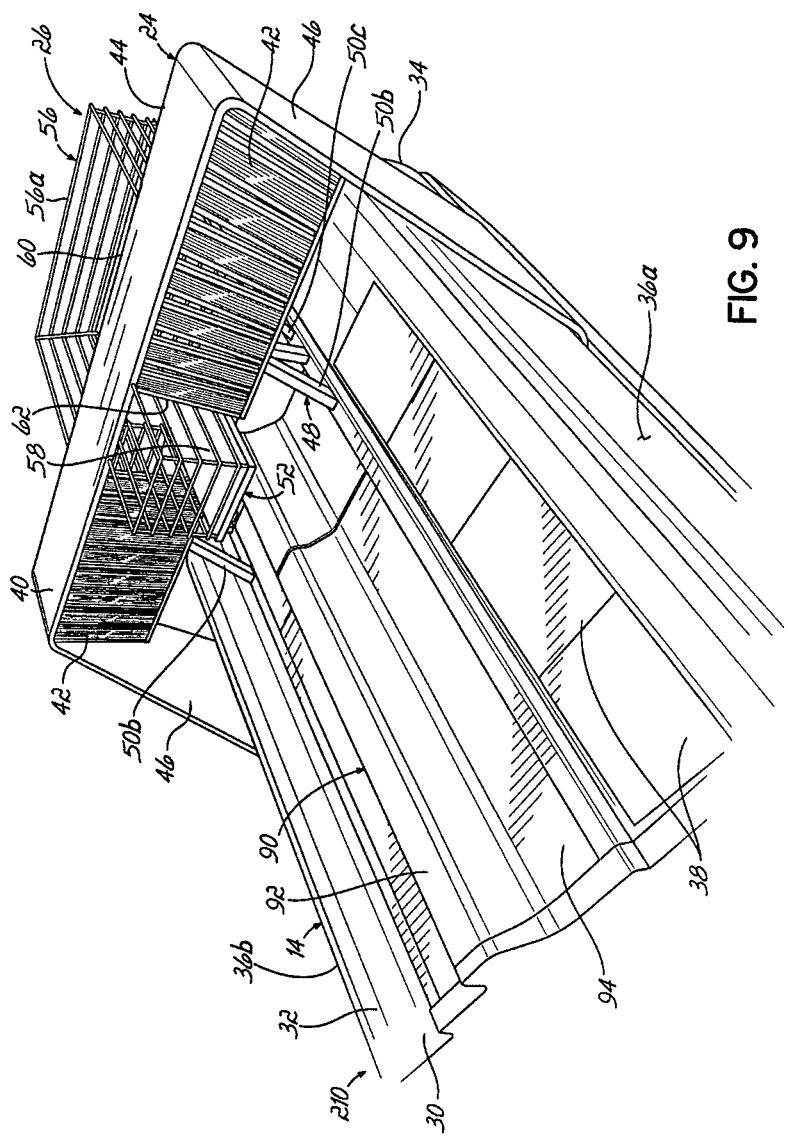
FIG. 9 is a partial perspective view of the nacelle of the wind turbine of FIG. 1, including a cooler and heliplatform arrangement according to a third embodiment.
Figure 10:
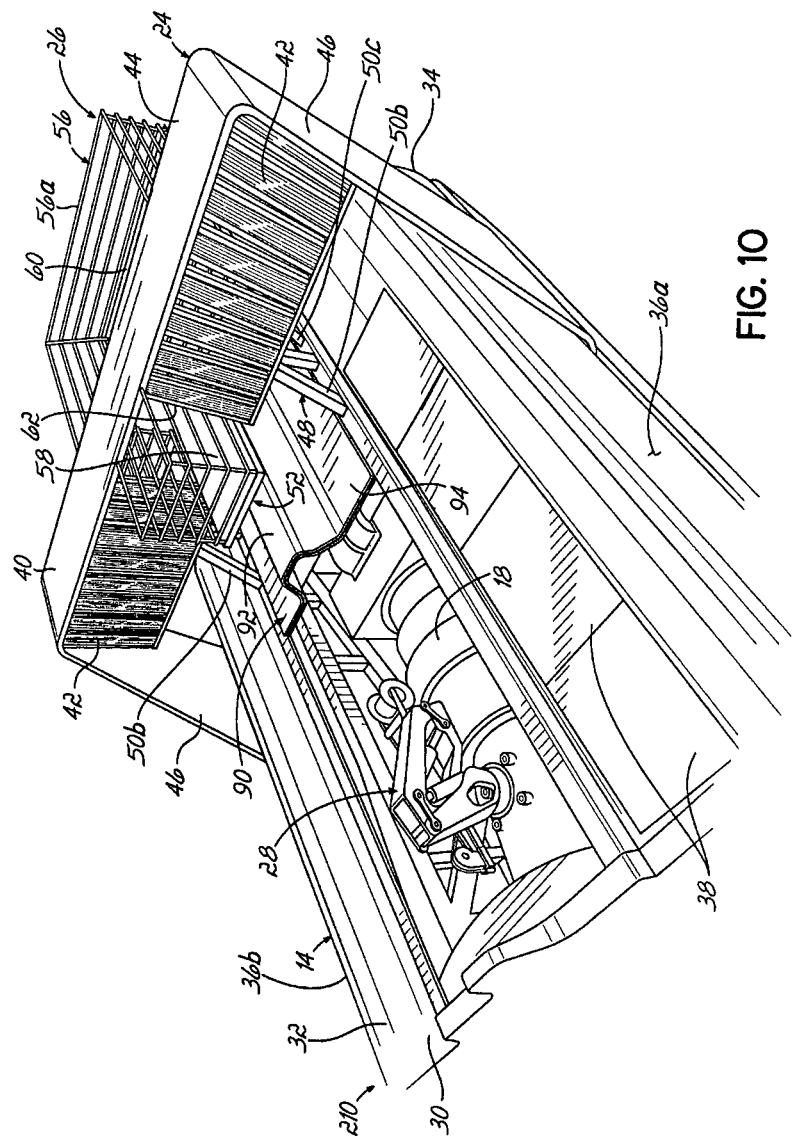
FIG. 10 is a partial perspective view of the nacelle of FIG. 9, with a unitary cover on the nacelle roof opened.

A third embodiment of the wind turbine 210 according to the invention is illustrated in FIGS. 9 and 10. This embodiment of the wind turbine 210 includes many of the same elements previously described with reference to FIGS. 1-8, and these elements have been provided with the same reference numbers. In this embodiment, the support structure 48 is located in the same position as the previous embodiment of FIGS. 7 and 8 such that the front portion 58 of the platform 52 extends through the gap 62 in the cooler panels 42. The top 56a of the railing 56 of the heliplatform 26 is again positioned substantially coplanar with the top wall 44 of the spoiler 40, as shown in FIG. 9. Consequently, the top 56a of the railing 56 remains the highest structure on the nacelle 14 so as to comply with safety regulations. A worker or a replacement component may be moved between the rear portion 60 of the platform 52 and the front portion 58 by moving through the gap 62 in the cooler panels 42 underneath the spoiler 40.

In the third embodiment of the wind turbine 210, the nacelle roof 32 includes a unitary sliding cover 90 configured to cover the crane 28 in a stowed position instead of the cover 70 formed by the panels 38 of the first-described embodiment. The unitary cover 90 includes a raised portion 92 projecting above the nacelle roof 32 and a second portion 94 configured to be substantially coplanar with the remainder of the nacelle roof 32. The boom 66 of the crane 28 is configured to snugly fit within the raised portion 92 when the cover 90 is closed, as shown in FIG. 9. In this regard, the crane 28 is generally not operable within a closed nacelle 14, in contrast to that described with reference to the first embodiment.

To deploy the crane 28, the cover 90 may be configured to slide rearward along the nacelle roof 32. The sliding movement of the cover 90 may be enabled by known mechanical or electrical actuators. When the cover 90 is opened, as shown in FIG. 10, the crane 28 may be moved to the operational position above the nacelle roof 32. As with the previous embodiment, and as shown in FIGS. 6A and 6B, the telescoping boom 66 of the crane 28 may be extended so that items may be moved from the heliplatform 26 to the interior of the nacelle 14 through one or more of the selected panels 38. When movement of items is complete, the crane 28 may be moved back to the stowed position shown in FIG. 10 such that the unitary cover 90 may be moved back to the closed position. It will be understood that the bifurcated cover 80 and the unitary cover 90 may be modified to pivotally open or slide open in a different direction in other embodiments within the scope of this invention.

Another embodiment of the wind turbine 310 according to the invention is illustrated in FIGS. 11A and 11B. This embodiment of the wind turbine 310 includes many of the same elements previously described with reference to FIGS. 1-10, and these elements have been provided with the same reference numbers. In this embodiment, the gap 62 in the cooler panels 42 has been partially filled with a central cooler panel 100 having an upper panel portion 102 and a lower panel portion 104. The upper panel portion 102 may be pivotally coupled to the spoiler 40 by a hinge (not shown) or similar connector such that the upper panel portion 102 is rotatable between a closed position shown in FIG. 11A and an open position shown in FIG. 11B. In the closed position, the upper panel portion 102 is generally coplanar or aligned with the remaining cooler panels 42. In the open position, the upper panel portion 102 is rotated out of alignment with the remaining cooler panels 42 such that passage of items or workers between the front portion 58 and the rear portion 60 of the platform 52 is enabled. Alternatively, the upper panel portion 102 may be pivotally coupled to the heliplatform 26 and/or an adjacent cooler panel 42 in other embodiments.

It will be understood that the upper panel portion 102 may be operatively coupled with the lower panel portion 104 such that the second fluid flowing through the upper panel portion 102 may be routed into the nacelle 14 for cooling interior components of the nacelle, as previously described with reference to the cooler panels 42. Moreover, the lower panel portion 104 is illustrated as spaced from the nacelle roof 32 in the illustrated embodiment, but the lower panel portion 104 may alternatively be pivotally coupled to the nacelle roof 32 by a hinge (not shown) or similar connector such that the lower panel portion 104 may also be rotated between a closed position and an open position. For example, this moveable lower panel portion 104 may be provided in embodiments with sliding covers 80, 90 having raised portions 86, 92 that must pass through the cooler panels 42 underneath the heliplatform 26. It will also be understood that the upper panel portion 102 and the lower panel portion 104 may be coupled together for unitary rotational movement about one or more hinge-like connections with the spoiler 40 and/or the nacelle roof 32.

FIGS. 11A and 11B also illustrate that the plurality of cooler panels 42 may include corresponding openings 106 configured to receive the front legs 50*b* of the triangular frame members 50 making up the support structure 48 for the heliplatform 26. In this regard, the plurality of cooler panels 42 may be modified as necessary to receive the various members of the support structure 48 at least partially integrated with the spoiler 40 and the cooler 24.

In summary, the wind turbines 10, 110, 210, 310 of the present invention incorporate the support structure 48 for a heliplatform 26 with a cooler 24 such that the railing 56 of the heliplatform 26 is disposed at the highest point on the wind turbine 10 (excluding the blades 22). The wind turbine 10 therefore advantageously provides both a cooler 24 and a heliplatform 26 while complying with various safety regulations for wind turbines. Furthermore, the wind turbine 10 of the present invention includes a crane 28 that is operable to move items to and from the heliplatform 26 and the interior of the nacelle 14. The crane 28 is stowed within the nacelle 14 when not in use by providing a cover 70, 80, 90 on the nacelle roof 32 as described in further detail above.

While the present invention has been illustrated by a description of various preferred embodiments and while these embodiments have been described in some detail, it is not the intention of the inventors to restrict or in any way limit the scope of the appended claims to such detail. Additional advantages and modifications will readily appear to those skilled in the art. Thus, the various features of the invention may be used alone or in any combination depending on the needs and preferences of the user.

The invention claimed is:

1. A wind turbine, comprising:
   a tower;
   a nacelle disposed adjacent a top of the tower and including a nacelle roof; a rotor including a hub and at least one wind turbine blade, the rotor operatively coupled to a generator housed within the nacelle;
   a cooler including a spoiler and at least one cooler panel projecting above the nacelle roof, the cooler being operable to remove heat from an interior of the nacelle; and
   a heliplatform including a support structure extending from the nacelle and at least partially integrated with the cooler.

2. The wind turbine according to claim 1, wherein the heliplatform includes a front portion extending forward of the at least one cooler panel, and a rear portion disposed rearward of the at least one cooler panel.

3. The wind turbine according to claim 2, wherein the at least one cooler panel includes a plurality of cooler panels, and the front portion of the heliplatform extends through a gap formed between two of the cooler panels.

4. The wind turbine according to claim 2, wherein the at least one cooler panel includes a plurality of cooler panels, and one of the cooler panels located adjacent to the front portion of the heliplatform is pivotally coupled to one or more of the spoiler, the heliplatform, and an adjacent cooler panel, the pivotally-coupled cooler panel being moveable between a closed position aligned with the plurality of cooler panels and an open position permitting passage between the front and rear portions of the heliplatform through the plurality of cooler panels.

5. The wind turbine according to claim 1, wherein the heliplatform includes a platform, and the support structure of the heliplatform includes at least one triangular frame having a top leg adjacent the platform and front and rear legs extending from the top leg and through the nacelle to the interior frame structure of the nacelle.

6. The wind turbine according to claim 5, wherein the at least one triangular frame passes through one or more corresponding openings in the at least one cooler panel.

7. The wind turbine according to claim 1, wherein the support structure of the heliplatform positions at least a portion of the heliplatform at the same height as the spoiler or above the spoiler.

8. The wind turbine according to claim 1, further comprising
a crane coupled to the nacelle and configured to move between a first stowed position underneath the nacelle roof and a second operational position, the crane being selectively positionable in the second operational position over the heliplatform.

9. The wind turbine according to claim 8, wherein the nacelle roof includes one or more panels configured to be opened to provide access between an interior of the nacelle and the external surroundings.

10. The wind turbine according to claim 8, wherein the nacelle includes an interior frame structure and components, and the nacelle roof is raised above and spaced from the interior frame structure and components so that the crane may be stowed in the stowed position completely underneath the nacelle roof.

11. The wind turbine according to claim 10, wherein the nacelle roof is positioned to provide adequate space between the nacelle roof and the interior frame structure and components to enable movement and operation of the crane within the nacelle without opening the one or more panels in the nacelle roof.

12. The wind turbine according to claim 8, wherein the nacelle includes an interior frame structure and components, the crane includes a boom, and the one or more panels includes a cover for the crane, the cover including a raised portion projecting above the interior frame structure and components and configured to receive the boom when the crane is stowed in the stowed position.

13. The wind turbine according to claim 12, wherein the cover for the crane is bifurcated into a first cover portion and a second cover portion, the first and second cover portions being moveable away from one another to uncover the crane and permit the crane to move from the stowed position to the operational position.

14. The wind turbine according to claim 12, wherein the cover for the crane is a unitary cover moveable with respect to the nacelle roof to uncover the crane and permit the crane to move from the stowed position to the operational position.

15. The wind turbine according to claim 8, wherein the boom of the crane includes a telescoping mechanism configured to enable movement of the crane in the operational position from the nacelle roof to the heliplatform.

16. The wind turbine according to claim 8,
wherein the crane is operable in the operational position to hoist items from the heliplatform over the cooler and into the nacelle through the nacelle roof.

\* \* \* \* \*